(12) United States Patent
Bulkowski (10) Patent No.: US 7,441,014 B1
(45) Date of Patent: Oct. 21, 2008

(54) BROADCAST DISTRIBUTION USING LOW-LEVEL OBJECTS AND LOCATOR TABLES

(75) Inventor: Brian Bulkowski, San Francisco, CA (US)

(73) Assignee: TVWorks, LLC, Philadelphia, PA (US)

( * ) Notice: Subject to any disclaimer, the term of this patent is extended or adjusted under 35 U.S.C. 154(b) by 0 days.

(21) Appl. No.: 09/500,698

(22) Filed: Feb. 9, 2000

(51) Int. Cl.
*G06F 15/16* (2006.01)
*G06F 15/173* (2006.01)

(52) U.S. Cl. .................. 709/218; 709/201; 709/240

(58) Field of Classification Search .......... 709/212, 709/213, 218, 219, 231, 235, 201, 240
See application file for complete search history.

(56) References Cited

U.S. PATENT DOCUMENTS

| | | | |
|---|---|---|---|
| 4,035,835 A | 7/1977 | Poetsch | |
| 5,373,561 A | 12/1994 | Haber et al. | 380/49 |
| 5,436,673 A | 7/1995 | Bachmann | |
| 5,453,779 A | 9/1995 | Dan et al. | 348/7 |
| 5,497,422 A | 3/1996 | Tysen et al. | 380/25 |
| 5,541,638 A | 7/1996 | Story | 348/7 |
| 5,623,422 A * | 4/1997 | Williams | 709/240 |
| 5,680,458 A | 10/1997 | Spelman et al. | 713/277 |
| 5,754,939 A | 5/1998 | Hertz et al. | 455/4.2 |
| 5,761,306 A | 6/1998 | Lewis | 380/21 |
| 5,787,172 A | 7/1998 | Arnold | 380/21 |
| 5,796,840 A | 8/1998 | Davis | 380/50 |
| 5,808,628 A | 9/1998 | Hinson | |
| 5,848,410 A * | 12/1998 | Walls et al. | 707/4 |

(Continued)

FOREIGN PATENT DOCUMENTS

EP 0810790 3/1997 ............ 7/88

(Continued)

OTHER PUBLICATIONS

Bussey H E Et Al: "Service Architecture, Prototype Description, And Network Implications Of A Personalized Information Grazing Service" Multiple Facets Of Integration,San Francisco,Jun. 3-7, 1990 Institute Of Electrical And Electronic Engineers, pp. 1046-1053, XP000164339 see whole document.

(Continued)

*Primary Examiner*—William C. Vaugh, Jr.
*Assistant Examiner*—Kristie D Shingles
(74) *Attorney, Agent, or Firm*—Saul Ewing LLP; Stephen J. Driscoll (57) ABSTRACT

The invention includes a method and system for serving data on broadcast media that uses low-level data objects to reduce repetition of common data, that uses indirect naming and machine-readable names to provide easy access to a large part of the broadcast spectrum, and that obtains a data object in a single cycle with no loss, or in two cycles with moderate loss. A user can request a desired data object, such as a web page, which comprises one or more low-level objects. The bandwidth used for each low-level object can be separately set. Two desired data objects can include the same low-level object. The method allows the content creator flexibility in assigning bandwidth used and response time for specific request objects and is easy to implement. Objects can be broadcast across alternate protocols. A dynamic list of desired data objects (the "First-level Name Table") is maintained that references the low-level objects that compose them.

43 Claims, 5 Drawing Sheets

FIRST-LEVEL NAME TABLE

| HUMAN-READABLE REQUEST NAME (FIRST LEVEL NAME) | LOW-LEVEL DATA OBJECTS | |
|---|---|---|
| | ROOT OBJECT (PRIORITY=1) | OTHER DATA OBJECTS (IN ORDER OF PRIORITY) |
| URL1 | 5 | 12,2,6,4,16 |
| URL2 | 10 | 3,4,82 |
| URL3 | 9 | 12,4,15 |
| URL4 | 9 | 3,4,15 |
| ... | ... | ... |
| URL_n | 3 | 12,4,2,17 |
| NICKNAME1 | 5 | 12,2,6,4,16 |
| NICKNAME2 | 5 | 12,2,6,4,16 |
| ... | ... | ... |
| NICKNAME_m | 3 | 12,4,2,17 |

U.S. PATENT DOCUMENTS

| | | | | |
|---|---|---|---|---|
| 5,850,232 | A | 12/1998 | Engstrom et al. | 345/511 |
| 5,862,220 | A | 1/1999 | Perlman | 380/21 |
| 5,862,451 | A * | 1/1999 | Grau et al. | 725/116 |
| 5,867,166 | A | 2/1999 | Myhrvold | |
| 5,870,765 | A | 2/1999 | Bauer et al. | 707/203 |
| 5,874,967 | A | 2/1999 | West et al. | 345/435 |
| 5,877,741 | A | 3/1999 | Chee et al. | 345/113 |
| 5,892,917 | A * | 4/1999 | Myerson | 709/224 |
| 5,893,095 | A * | 4/1999 | Jain et al. | 707/6 |
| 5,918,229 | A * | 6/1999 | Davis et al. | 705/26 |
| 5,936,606 | A | 8/1999 | Lie | 345/113 |
| 5,936,659 | A * | 8/1999 | Viswanathan et al. | 725/103 |
| 5,940,071 | A | 8/1999 | Treffers et al. | 345/327 |
| 5,963,978 | A * | 10/1999 | Feiste | 711/158 |
| 5,973,681 | A * | 10/1999 | Tanigawa et al. | 345/716 |
| 5,977,960 | A | 11/1999 | Nally et al. | 345/191 |
| 6,005,574 | A | 12/1999 | Herrod | 345/344 |
| 6,009,363 | A | 12/1999 | Beckert et al. | 701/33 |
| 6,018,768 | A | 1/2000 | Ullman et al. | 709/218 |
| 6,028,583 | A | 2/2000 | Hamburg | 345/112 |
| 6,047,269 | A | 4/2000 | Biffar | 705/39 |
| 6,047,317 | A * | 4/2000 | Bisdikian et al. | 725/142 |
| 6,049,551 | A * | 4/2000 | Hinderks et al. | 370/468 |
| 6,049,628 | A | 4/2000 | Chen | |
| 6,049,835 | A * | 4/2000 | Gagnon | 709/227 |
| 6,052,594 | A * | 4/2000 | Chuang et al. | 455/450 |
| 6,085,193 | A * | 7/2000 | Malkin et al. | 707/10 |
| 6,085,235 | A * | 7/2000 | Clarke et al. | 709/219 |
| 6,104,727 | A * | 8/2000 | Moura et al. | 370/230 |
| 6,108,703 | A * | 8/2000 | Leighton et al. | 709/226 |
| 6,128,619 | A * | 10/2000 | Fogarasi et al. | 707/102 |
| 6,212,681 | B1 | 4/2001 | Ikeda | 725/92 |
| 6,278,448 | B1 * | 8/2001 | Brown et al. | 715/866 |
| 6,324,582 | B1 * | 11/2001 | Sridhar et al. | 709/230 |
| 6,330,555 | B1 | 12/2001 | Weber | 707/2 |
| 6,351,565 | B1 * | 2/2002 | Boon | 382/236 |
| 6,356,903 | B1 * | 3/2002 | Baxter et al. | 707/10 |
| 6,362,817 | B1 * | 3/2002 | Powers et al. | 345/419 |
| 6,421,733 | B1 * | 7/2002 | Tso et al. | 709/246 |
| 6,445,822 | B1 * | 9/2002 | Crill et al. | 382/218 |
| 6,489,980 | B1 * | 12/2002 | Scott et al. | 715/854 |
| 6,501,770 | B2 * | 12/2002 | Arsenault et al. | 370/477 |
| 6,502,139 | B1 * | 12/2002 | Birk et al. | 709/233 |
| 6,539,420 | B1 * | 3/2003 | Fields et al. | 709/206 |
| 6,578,192 | B1 * | 6/2003 | Boehme et al. | 717/115 |
| 6,625,811 | B1 * | 9/2003 | Kaneko | 725/94 |
| 6,725,421 | B1 * | 4/2004 | Boucher et al. | 715/500.1 |
| 6,738,380 | B1 * | 5/2004 | Imai et al. | 370/395.42 |
| 6,754,696 | B1 * | 6/2004 | Kamath et al. | 709/213 |
| 6,763,496 | B1 * | 7/2004 | Hennings et al. | 715/501.1 |
| 6,778,971 | B1 * | 8/2004 | Altschuler et al. | 706/55 |
| 6,785,902 | B1 * | 8/2004 | Zigmond et al. | 725/38 |
| 6,788,709 | B1 * | 9/2004 | Hyakutake | 370/486 |
| 6,789,075 | B1 * | 9/2004 | Nielsen | 707/5 |
| 6,891,859 | B2 * | 5/2005 | Hyakutake | 370/486 |
| 6,907,429 | B2 * | 6/2005 | Carneal et al. | 707/10 |
| 6,981,017 | B1 * | 12/2005 | Kasriel et al. | 709/203 |

OTHER PUBLICATIONS

Wyle M F: "A Wide Area Network Information Filter" Proceedings International Conference Artificial Intelligence On Wall Street, Oct. 9, 1991, pp. 10-15, XP000534152 see the whole document.

Lang K: "NewsWeeder: learning to filter netnews" Machine Learning. Proceedings Of The Twelfth International Conference On Machine Learning, Tahoe City, CA, USA, Jul. 9-12, 1995, San Francisco, CA, USA, Morgan Kaufmann Publishers, USA, pp. 331-339, XP002046557 see the whole document.

Rosenfeld L B, et al: "Automated Filtering Of Internet Postings" Online, vol. 18, No. 3, May 1994, pp. 27-30, XP000616769 see the whole document.

Yan T W, et al: "Sift—A Tool For Wide-Area Information Dissemination" Usenix Technical Conference, Jan. 16, 1995, pp. 177-186, XP000617276 see the whole document.

* cited by examiner

FIG. 1

FIRST-LEVEL NAME TABLE

| HUMAN-READABLE REQUEST NAME (FIRST LEVEL NAME) | LOW-LEVEL DATA OBJECTS ||
|---|---|---|
| | ROOT OBJECT (PRIORITY=1) | OTHER DATA OBJECTS (IN ORDER OF PRIORITY) |
| URL1 | 5 | 12,2,6,4,16 |
| URL2 | 10 | 3,4,82 |
| URL3 | 9 | 12,4,15 |
| URL4 | 9 | 3,4,15 |
| ... | ... | ... |
| URL_n | 3 | 12,4,2,17 |
| NICKNAME1 | 5 | 12,2,6,4,16 |
| NICKNAME2 | 5 | 12,2,6,4,16 |
| ... | ... | ... |
| NICKNAME_m | 3 | 12,4,2,17 |

FIG. 2

LOW-LEVEL DATA OBJECT LOCATOR TABLE

| DATA OBJECT NAME (INTEGER) | TOTAL NUMBER OF TIMES OBJECT IS SENT | SIZE (BYTES) | BAND-WIDTH (KBIT/s) | PROTOCOL TYPE 0=MPEG; 1=MULTI-CAST IP | LOCATION Protocol Type=MPEG: TransportID (tuner freq).programID.tableID.extendedtableID Protocol Type=Multicast IP: Multicast IP address, UDP Port Number, Extended Table ID |
|---|---|---|---|---|---|
| 1 | 10 | 1880 | 2 | 0 | 16.14.06.01 |
| 2 | 5 | 564 | 4 | 0 | 5.12.12.22 |
| 3 | 10 | 564 | 2 | 0 | 6.07.07.01 |
| 4 | 2 | 1128 | 1 | 0 | 3.06.07.01 |
| 12 | 2 | 564 | 2 | 1 | 225.0.0.1,500,1000 |
| 15 | 3 | 188 | 6 | 0 | 1.02.07.01 |
| 18 | 15 | 1504 | 12 | 0 | 3.06.07.02 |
| ... | ... | ... | ... | ... | ... |

BROADCAST DISTRIBUTION USING LOW-LEVEL OBJECTS AND LOCATOR TABLES

BACKGROUND OF THE INVENTION

1. Field of the Invention

This invention relates to broadcast transmission.

2. Related Art

The ability to efficiently provide data to very large numbers of users is becoming increasingly important as the use of computer networks and web-based services grows.

Broadcast distribution, where communication is one-way only, is a method for distributing data to very large numbers of users. For a particular set of data, such as data comprising a web page, a broadcast server repeats the data a finite number of times. The rate at which the server transmits the data is a measure of the bandwidth of the data.

A communication medium has a limited amount of bandwidth. Bandwidth is valuable, for reasons including human desire for a fast response, increasing consumer usage of on-line services and data, and increasing types and variety of on-line data. In addition, limited resources available on inexpensive consumer computing devices can impose a limit on the amount of bandwidth that such devices can process.

The bandwidth on a communication medium can be divided into frequency ranges. In current enhanced TV technology, the communication medium is a shared cable or wire frequency, and a channel is defined by its center frequency and width, with the width and modulation type determining the total number of bits per second (total bandwidth) that the channel can carry. For example, currently a broadcast wire may carry 40 to 50 physical channels, with a channel carrying a video signal component, an audio signal component, and data component. Furthermore, a digital channel can be modulated using Quadrature Amplitude Modulation (QAM 64) and thus can contain several video, audio, and data streams. The data component can carry data including data comprising web pages. MPEG protocols are sometimes used.

In digital satellite transmission, each satellite has a cluster of transponders. In recent satellite technology, each transponder can carry 10 to 20 physical frequencies, and a satellite will have many transponders. Thus, the amount of data and number of channels possible is large.

Consumer computing devices currently can listen to only a few physical channels at a time.

The time it takes to transmit the data for a given web page or other data object is called a cycle. It is the size of the data object divided by the bandwidth used to send the object. For instance, a 150 Kbit web page that is sent at a bandwidth of 1000 Kbits per second has a cycle of 0.15 seconds. It is desirable for a cycle to be short, which requires more bandwidth. It is also desirable for a channel to carry a large of amount of web pages or other data, which also consumes bandwidth.

A problem in the known art is that some implementations of broadcast transmission require more than one cycle for the receiver to obtain a complex set of data, usually due to the requirement that objects must be received in an ordered process. This results in longer response times.

Data on an enhanced TV channel often can be related to the content of the video on the channel. For example web pages of interest to children can be available on the same physical channel as the Disney video channel. Alternatively or additionally, a channel can carry data having unrelated content. An example is a channel with child-oriented video programming carrying a home banking web page.

A way to achieve broadcast transmission is to transmit the name of the web page and the data comprising the web page together. This can be achieved by putting the web page name into the header of each packet. Using this method, the receiver not only must monitor all the data transmitted on the channel, but also store the entire packet locally in case it may be needed in the future. In practical application, to assure acceptable response time, the receiver stores all the data so that it is available for immediate access. A disadvantage of this method is it that for high data rates it requires a powerful processor and significant buffer at the client. (Digital television carries enhancing information at a rate many orders of magnitude greater than analog television.) A further disadvantage is that if there is not enough processing power or buffer, the system will fail. Another disadvantage is that limitations on the amount of data that can be buffered imposes a limit on the amount of broadcast spectrum the user can access.

Another method also treats the web page as a file. The name of the web page is not sent in each packet header but instead a map of the name to the address in the data stream is stored in the receiver, is broadcast, or otherwise made available to the receiver. (The map is dynamic.) When a user requests a desired data object, such as a web page, the receiver looks up the name and obtains the location of the data. Because the receiver need not process all of the actual data, but only the references to the data, this method requires relatively little processing capability and memory. It is possible to store many names, thereby achieving wider spectrum coverage.

However, this method has the disadvantage that it may require extensive repetition of data. Often two different web pages contain some components that are identical. For instance, all Disney web pages may include the Disney logo. Or multiple web pages may carry an identical banner advertisement. (A moderately complex web page may have 40-50 image files.) Using file-oriented methods wastes bandwidth because bandwidth must be consumed for each instance of this common data. For example, if a logo with a size of 100 Kbit appears in 50 web pages, and each web page is sent at a bandwidth of 100 Kbit/s, the total bandwidth used by the logo data is 5000 Kbits/s, which wastes 4900 Kbits/s. However, no advantage is realized from this large amount of bandwidth consumed by the logo data, as each instance of the logo is associated only with the file it is transmitted in.

It would also be possible to use a method in which web pages are treated as consisting of sub-files, giving a name to each sub-file, and enclosing the name of each sub-file in a master file that is also sent. This method would encounter problems already discussed, such as needing to first retrieve the master file, and needing to read the bytes of each sub-file in order. This method would be cumbersome for a programmer to implement. It would require the data to be sent at a higher rate to achieve the desired performance as a one-step receive system.

It would be advantageous for a user to be able to address spectrum that is carried on channels other than the one his receiver is tuned to. For instance, it would be convenient for a user to be able to jump to his home banking web page even if he has not been watching the video channel the web page is carried on, i.e. regardless of what channel his receiver is tuned to.

It is also desirable to provide a method of serving data on broadcast media that provides access to data in a known period of time, that uses bandwidth efficiently, that works with a receiver having relatively limited resources, and that provides access to a large part of the broadcast spectrum. It is also desirable to address broadcast objects across alternate transport protocols, such as MPEG and multicast IP, as well as alternate high level protocols such as Advanced Television Enhancement Forum standard ("ATVEF", see www.atvef.com) and DSM-CC. It is further desirable that this method be easy to implement for the content provider, and provide flexibility and certainty to the content provider in creating its programming.

These advantages are achieved in the invention which uses low-level objects and organizes data and data references in a multi-level design.

SUMMARY

The invention includes a method and system for serving data on broadcast media that uses low-level data objects to reduce repetition of common data, that uses indirect naming and machine-readable names to provide easy access to a large part of the broadcast spectrum, and that obtains a data object in a single cycle with no loss, or in two cycles with moderate loss. A user can request a desired data object, such as a web page, which comprises one or more low-level objects. The bandwidth used for each low-level object can be separately set. Two desired data objects can include the same low-level object. The method allows the content creator flexibility in assigning bandwidth used and response time for specific request objects and is easy to implement. Objects can be broadcast across alternate protocols. A dynamic list of desired data objects (the "First-level Name Table") is maintained that references the low-level objects that compose them.

DETAILED DESCRIPTION OF A PREFERRED EMBODIMENT

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Overview of the Invention

The size of a chunk of data divided by the bandwidth allocated to the chunk is the time it takes to transmit the data, which we call one cycle. The goal of rapidly transmitting data competes for limited bandwidth with the goal of carrying more total data on an enhanced TV cable or other data communication link. The method and system of the invention uses available bandwidth efficiently by reducing repetition of data. It also enables a data object to be retrieved in a single cycle. This reduces the bandwidth required.

In addition, the large number of existing data channels has made it impractical to find a program or web page simply by "switching channels".

It is desirable for the user to be able to access favorite web pages whether or not the user has selected the channel that is carrying the web page. With the current invention, this is possible because the levels of indirection and minimal use of human-readable names make it practical to carry a larger directory of names, as described below.

A set of data making up a desired data object can be broken into component parts. For example, but without limitation, a web page can be broken into a root web page plus images—such as gif files. Another example is a word processing file can be broken into chunks of data of arbitrary size. In the invention these components of the desired data object are called low-level data objects. They can be sent as separate data, for example, but without limitation, as an MPEG table. Other formats can be used.

A preferred embodiment keeps a data structure of human-readable names of the data that a user can request (the "First-level Name Table"). The names can be, for instance, web site URLs or web page titles. The data structure includes, for each desired data object, references to the low-level data objects that compose it. Low level data objects have second-level names that are designed to use minimal storage, and can be, for example, but without limitation, 2-byte integers. Because the list contains only a small amount of data per entry less storage is required. All other things being equal, this allows storage of a larger number of names and access to a large part of the spectrum.

A Low-level Data Object Locator Table has an entry for each low-level data object by second-level name. The entry contains the location in the data stream of the low-level data object. In a preferred embodiment, there is a third, separate table that holds locations of low-level data objects that are root web pages or other root objects; however, the information in such a third table can alternatively be incorporated into the Low-level Data Object Locator Table.

This method of organization guarantees that a low-level data object can be read in one cycle once the receiver has started to look for it. The locator table gives sufficient information for any packet belonging to the object to be identified and retrieved. Even if the receiver starts retrieval during the middle of the data object's cycle, it can capture all the packets broadcast from that point to the end of the cycle, and then capture the packets from the first part of the cycle in the immediate subsequent cycle. In a preferred embodiment, the MPEG address is used. This gives sufficient information to identify any MPEG data. For instance, if the address is a transport ID, program ID number (PID) and table ID, in a preferred embodiment, the table is retrieved. That is, a packet can be identified solely by the information contained within it, and does not need to be retrieved in order. In an alternative embodiment, the Low-level Data Object Locator Table can include a protocol field to allow for addressing of objects across multiple protocols, such as multicast IP, MPEG private sections, or IP with MPEG transport. For each object the Low-level Data Object Locator Table includes the address information appropriate for the object's protocol.

A given low-level object, such as a corporate logo image, can be sent at a bandwidth, such as 10 Mbit/s that (along with the object size) determines its cycle length. The bandwidth taken by each low-level object can be set separately.

Figure 1:
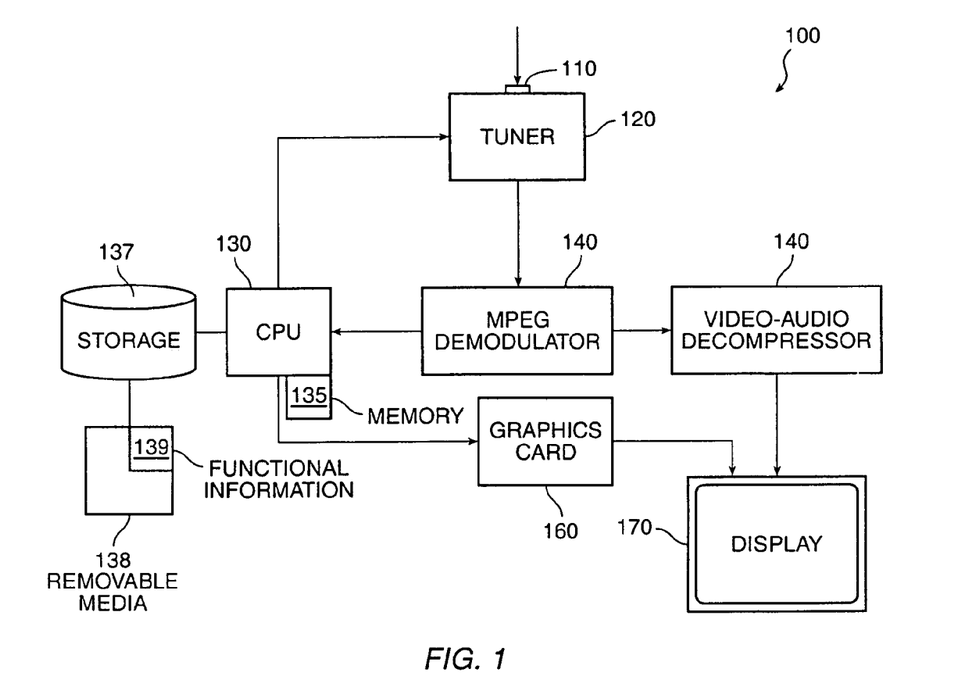
FIG. 1 shows a schematic drawing of a receiver.

FIG. 1 is a schematic drawing of one embodiment of a broadcast data/enhanced TV received 100. The receiver includes a tuner 120 that receives input through an input interface 110. The tuner 120 is coupled to a processor 130 and an MPEG demodulator 140. A memory 135, storage unit 137, and removable media 138 can be coupled to the processor 130. The removable media can contain functional information 139. The MPEG demodulator 140 is coupled to a Video-Audio processing card 150, which is coupled to a display unit 170. The processor 130 is coupled to a graphics card 160, which is coupled to a display unit 170.

The tuner 120 is tuned to a part of the broadcast spectrum in order to receive different channels.

Not all embodiments of the invention need include all these elements, and embodiments of the invention may include additional elements. In particular, the video and audio inputs need not be present in a system where video and audio signals are not of interest to the user of the system. In an alternative embodiment, only a communication link that can be either hard wire or wireless, and a processor are present. In an alternative embodiment, there can be additional levels of names.

Using the invention, the content creator has greater control and flexibility in achieving his goals. The content creator determines the content groupings. These decisions can be made with regard to marketing, economic, and technical considerations.

Definitions

A "desired data object" is data that the user can request. In a preferred embodiment, it can be a web page.

A "first-level name" in the First-level Name Table is the name by which a user requests an object. It can also and alternatively be a name associated with an icon by which a user requests an object.

For example, but without limitation, a first-level name can be a web page title or web page URL and can be represented by a human-readable string. In a graphical user interface, it can be an icon that is selected by the user, the icon being associated with a string. It could alternatively and additionally be a corporate name or stock ticker symbol, or a name or identifier associated with other data, including the name of a word processing file.

A "low-level data object" is data that is transmitted as a group. In a preferred embodiment, a data object can be transmitted formatted as an MPEG table. The low-level data object can be an HTML root web page, gif image file, or any other data. Low-level data objects have associated with them one or more second-level names. A data object can be broadcast by any known means; for instance, it is known to break an object into IP packets, or into MPEG sections, with appropriate information such as sequence number and byte offset included in the header.

The order in which the low-level data objects are to be retrieved is called "retrieval priority" or "priority". Priority is preferably expressed by relative position of the name of the data object in the First-level Name Table. Alternatively, classes of priority can be used.

A "root object" is a low-level data object with priority of 1, which is indicated by being the first low-level data object listed in the First-level Name Table. Where the desired data object is a web page, the root object preferably is the root web page. The root object contains information about what low-level data objects are needed and how they are put together to create the desired data object. In an alternative embodiment, described below, there is no root object.

A "content grouping" refers to how content is grouped. The term can refer to how a request object—such as a web page—is divided into components; it also can refer to how components are carried on a channel's data stream—how many times, and at what bandwidth. Many different possible content groupings exist for any given request object and any given channel. For instance, the entire request object can be a single object, or broken into large or small pieces.

The term "content creator" is used for the entity or entities that have control over what is in the data stream. The content creator preferably has control of the content groupings.

First-level Name Table

Figure 2:
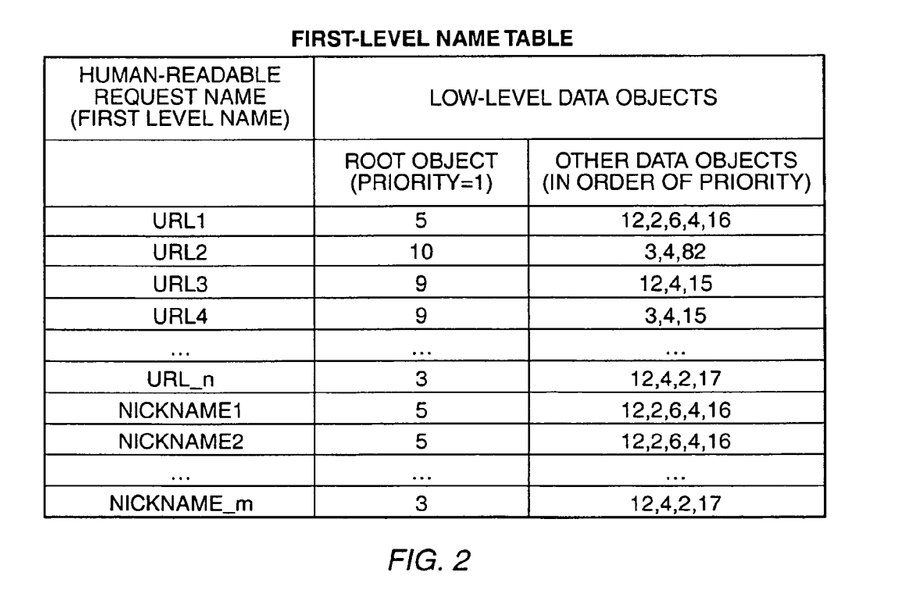
FIG. 2 shows a general format of a First-level Name Table.

The First-level Name Table is a table of the names of objects the user can retrieve ("desired data objects") and related information. It is a table of the content that the user can access. A sample table is shown in FIG. 2. In an alternative embodiment the table can also include the number of low-level data objects composing the desired object and/or additional priority information as described below.

The human-readable name used by the user to make the request is called the first-level name. In a preferred embodiment, this first-level name can be a web site URL or web page title. Techniques known in the art of web programming for permuting names into common variants, such as adding "http:\\www." as a prefix, can be used. Nicknames preferably can be implemented by adding an entry with the nickname into the First-level Name Table, or alternatively one or more separate field(s) can be added to the First-level Name Table to accommodate nicknames.

Associated with each entry in the table is a list of second-level names of the low-level data objects that are part of the desired data object. The second-level names are designed to take minimal storage space, and in a preferred embodiment can be a structure of 2-byte binary data. Preferably, the initial second-level name in the list will be the root object, which is the low-level data object that is preferably read first. Preferably, the root object is the root web page, known in the art of HTML programming.

As an example of a table, referring to FIG. 2, URL3 and URL4 can be the identical web page with one low-level object (having the second-level name of 12 in URL3) substituted for another (having the second-level name of 3 in URL4). The object named 12 can be an advertising gif file, and the object name 3 can be a gif file containing a different advertisement.

Retrieval Priority

In the First-level Name Table, after the root object, the rest of the second-level names preferably are listed in order of retrieval priority. These retrieval priorities are set at the discretion of the content provider. For instance, the content provider may decide that the central image should be retrieved and displayed before most of the other images, and therefore the central image object will be listed before most of the images in the First-level Name Table. This will improve user satisfaction, as users generally prefer seeing the central image first. Alternatively or in addition, the content provider may decide that a banner advertisement should be retrieved an displayed before most of the other images. Advertisers prefer the advertisement to be displayed for a relatively long time.

The retrieval priority of being first is preferably mandatory as to the root object. If multiple simultaneous receptions are allowed then the client has the necessary information to pursue a reception strategy that maximizes the user experience. (In a preferred embodiment, the MPEG demodulator 140 will retrieve the data. An MPEG demodulator typically has capacity to receive five data inputs at one time, and so can be in the process of retrieving five objects at one time.) In an alternative embodiment, retrieval of the root object first can be optional, or can depend on a flag indicating whether the retrieval is mandatory or optional.

The retrieval priority for objects other than the root object preferably can be a preferred or rough ordering. That is, it is not required that the objects be retrieved in the given order. Preferably, the MPEG demodulator starts retrieving the objects in order of priority on each of its available data inputs. Upon completion of retrieval of each object, the demodulator gives the object to the processor. So it is possible that an object with a short cycle will be retrieved before an object with a long cycle whose retrieval priority precedes that of the object with the short cycle.

In an alternative embodiment, retrieval priority can have values belonging to a priority class, such as A, B, C, and D; objects belonging to class A are retrieved sooner than objects belonging to class B. In such an embodiment, several low-level data objects have the same priority class. Classes can be implemented using a class field for each object, or using separate lists of object names for each class, or by any other known method.

In a preferred embodiment, each root object is unique and must be first in retrieval priority. That is, if a second-level name "12" is a root object, it cannot be in a list in a position other than first in the First-level Name Table of low-level objects.

Low-level Data Object Locator Table

Figure 3:
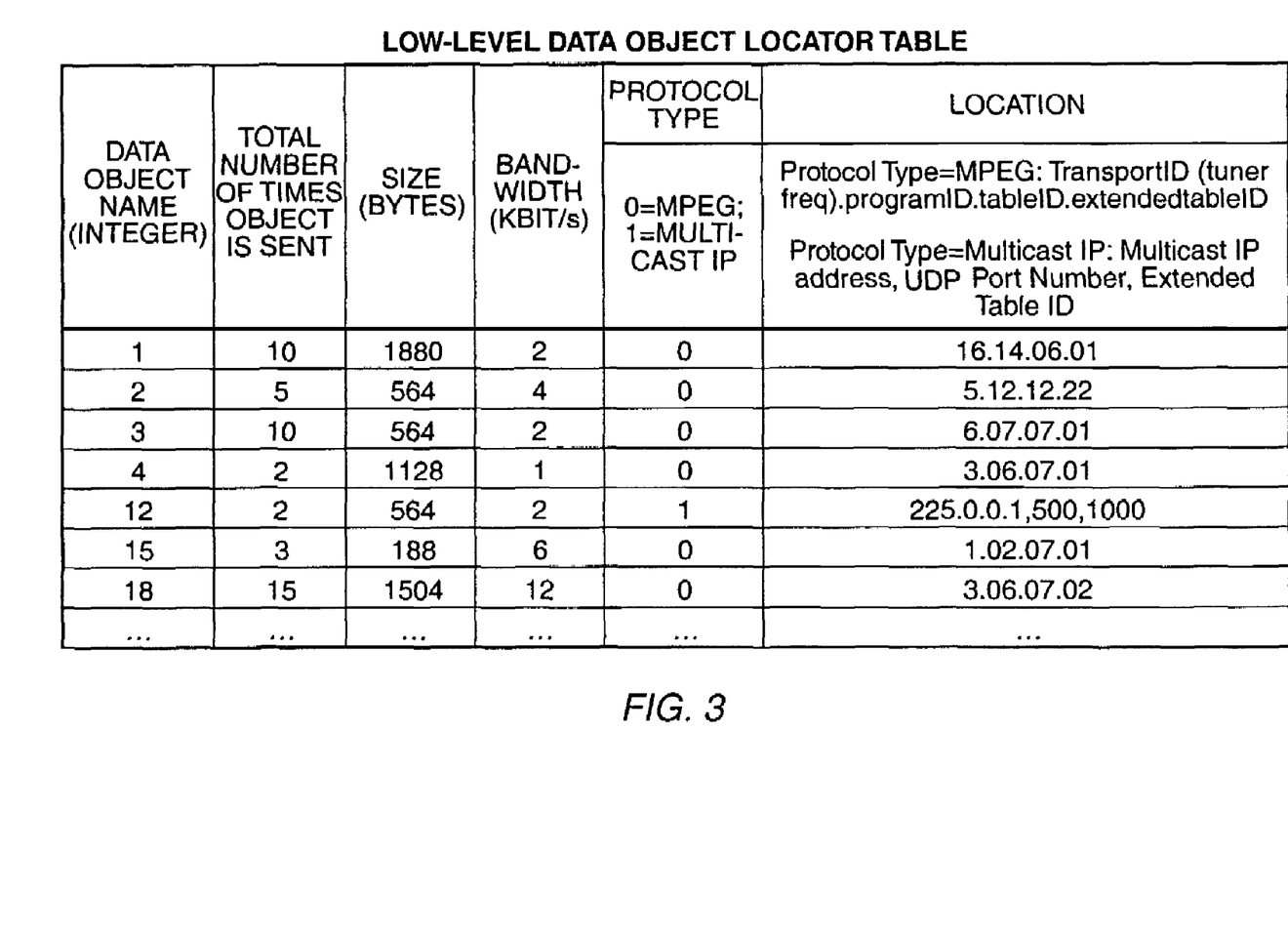
FIG. 3 shows a general format of a Low-level Data Object Locator Table.

FIG. 3 shows a sample low-level Data Object Locator Table, for an alternative embodiment that includes the protocol type flag. The location information shown where the Protocol Type=0 is appropriate for the preferred protocol of MPEG private sections. The table contains information about the low-level data objects (preferably, other than the root object) that is independent of the request object. There is an entry for each data object, by second-level name. Preferably, each entry contains the number of times the data object is sent, the size of the object in bytes, and the bandwidth of the object.

Each entry also has the physical location where the data object can be found. Preferably the data is transmitted using the MPEG protocol, and so the physical location is also preferably expressed in MPEG format, for example MPEG transport ID (physical frequency), MPEG program ID, MPEG table ID, and MPEG extended table ID. However, any location information that is sufficient to locate the data can be used. For instance, in case of MPEG, the MPEG extended table ID need not be included.

In an alternative embodiment, information about the root objects also can be kept in the Data Object Locator Table. The object alternatively can include a Protocol Type field (see FIG. 3). This allows alternative protocols such as Multicast IP, MPEG private sections, or IP with MPEG transport, to be supported. The location information in the Locator Table for a specific object is in the format for the particular protocol used.

Root Object Locator Table

In a preferred embodiment, location information about root objects is kept in a Root Object Locator Table. This table is substantially similar to the Data Object Locator table, with an entry for each root object by second-level name.

Obtaining the First-Level Name Table and Data Object Locator Table

Figure 4:
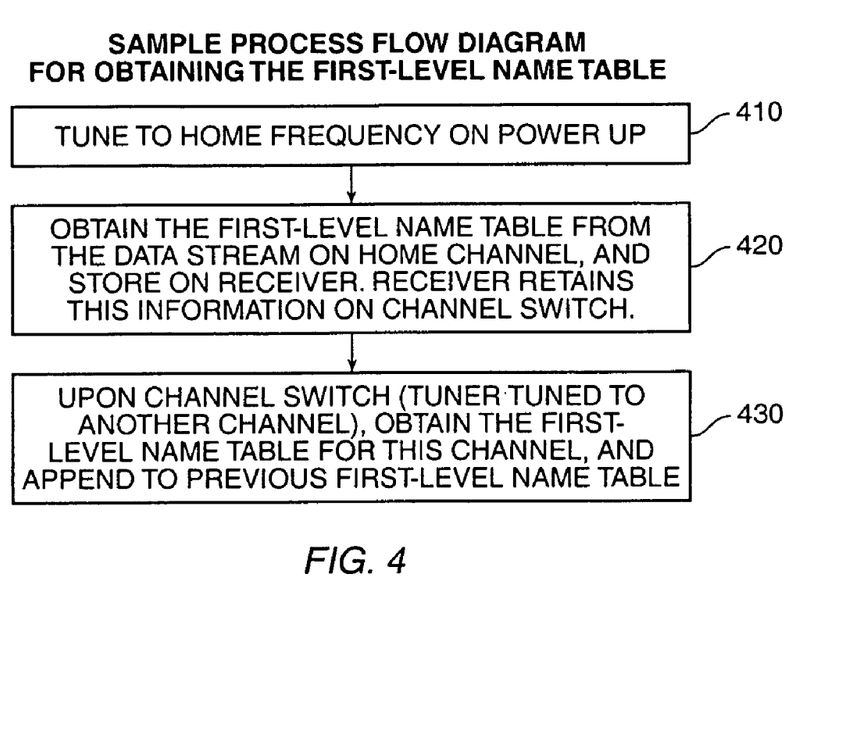
FIG. 4 is a process flow diagram for obtaining the First-level Name Table.

Some entries for the First-level Name Table is preferably obtained from the home channel. Information for some web pages, for example but without limitation ones that are either highly popular, or that have no particular relation to any video channel, is placed on the home channel. FIG. 4 shows a sample process flow diagram for obtaining the First-level Name Table. Obtaining programming information, commonly known as "system information" or "SI", is known in the art of enhanced TV and digital video, and any known method can be used to obtain and update the First-level Name Table and Data Object Locator Table.

The frequency of the home channel is preferably hardwired into the receiver, and the receiver tunes to this channel on power up 410, as known in the art. The receiver listens and obtains the directory information (i.e. the information for the First-level Name Table) from the data stream of the home channel 420. If each entry in the First-level Name Table takes 100 bytes of data, there are 1000 entries, and the data is transmitted at a rate of 10 Mbits/s, it would take 0.8 seconds to retrieve all the entries. The format and location of the information can be hardwired into the receiver or known to the receiver software or obtained through other known methods. Updates can be made when data changes by broadcasting a new list with a new version number as known in the art, or by any known method.

Additional First-level Name Tables can be carried on other multiplexes.

Upon a channel switch, the receiver listens to the data stream and obtains the First-level Name Table information and Data Object Locator Table from the channel that has been switched to 430. The format and location of the information is hardwired into the receiver or known to the receiver software or obtained through other known methods. Preferably, the information includes information for all data, including web pages, carried on the channel. It can also include directory information for other web pages that are related to the content of the channel. For instance, two child-oriented channels might carry each other's directory information, enabling a user to jump to web pages carried on either channel, from either of the two channels.

In an alternate embodiment, some channels can carry the First-level Name Table or Data Object Locator Table for programming on several channels. Alternatively, the home channel or other channel can carry such information for all channels.

Figure 5:
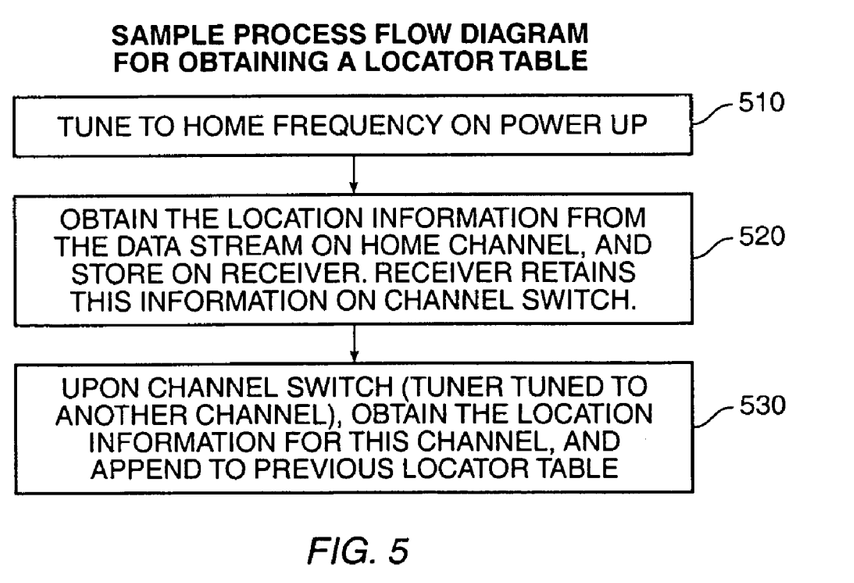
FIG. 5 is a process flow diagram for obtaining the Locator Table.

A process flow diagram for obtaining the Data Object Locator Table is shown in FIG. 5. The steps are the same as that outlined for obtaining the First-level Name Table and likewise any known method can be used to obtain the Data Object Locator Table. The home frequency is tuned to on power up 510, and the location information is obtained from the data stream on the home channel 520. This location information is retained on channel switch. On channel switch, the location information is obtained and appended to the previous locator table. 530.

In a preferred embodiment, there is a Root Object Locator Table that can be obtained in a manner similar to that of the Data Object Locator Table.

Responding to a User Request for an Object

Figure 6:
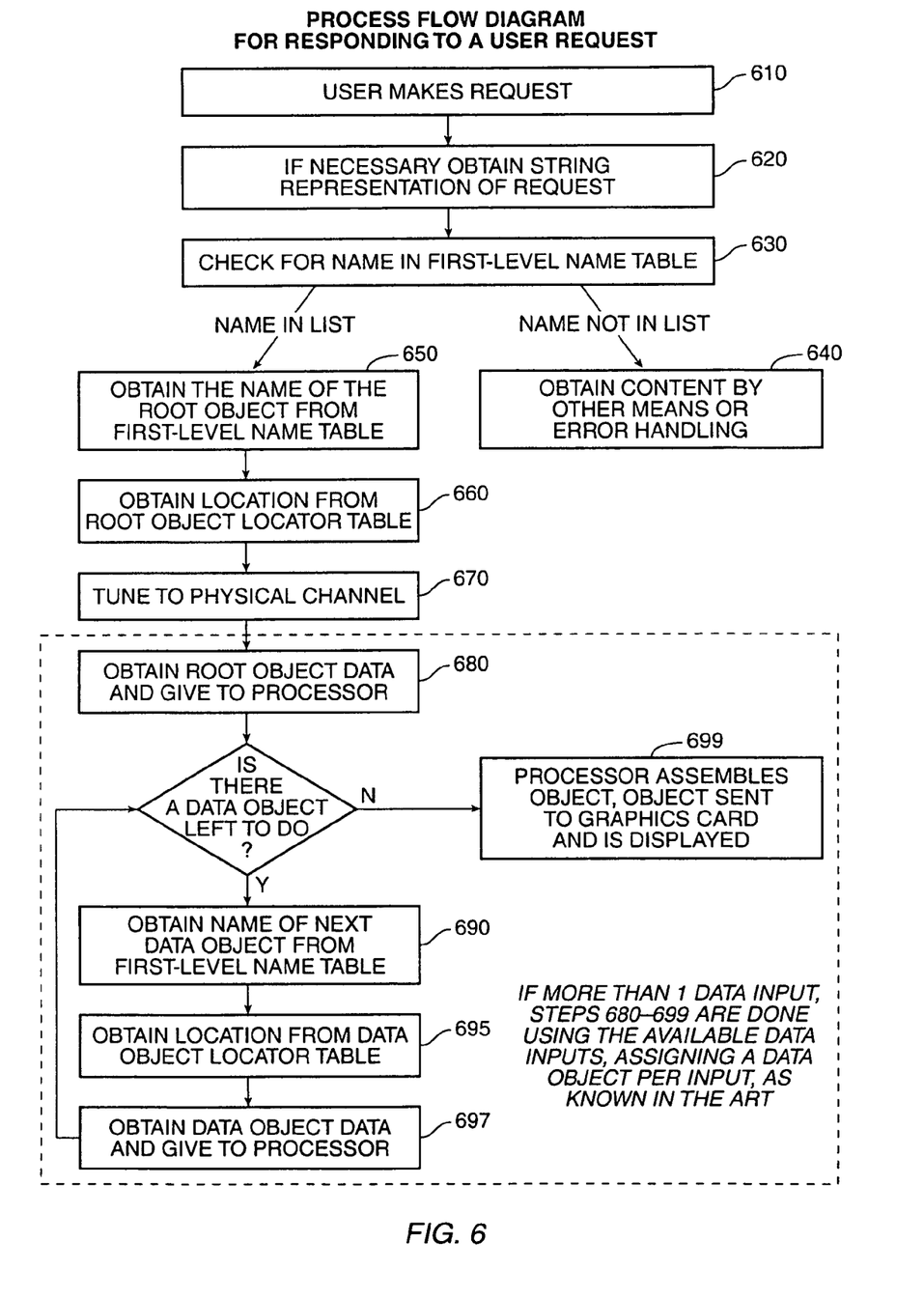
FIG. 6 is a process flow diagram for responding to a user request.

FIG. 6 shows a process flow diagram for responding to a user request. The user makes a request by clicking on a displayed button on the television display, or by typing in a human readable name, or by other methods known in the art of data broadcasting/enhanced TV. 610. If icon selection is used to make the request, the associated URL or other name is looked up 620. The name is looked up in the First-level Name Table 630.

If the name of the desired data object, the second-level name of the root object is obtained from the First-level Name Table 650. This second-level name of the root object is looked up in the Root Object Locator Table and its location information obtained 660. The tuner is tuned to the physical channel identified by the location information, for instance the MPEG transport ID 670. The MPEG demodulator obtains the root object and gives the data to the processor 680.

Preferably, the MPEG demodulator has more than one data input. The other low-level data objects are retrieved on these inputs. The data inputs are assigned in order of priority of the data objects. As all the data composing an object is obtained, the data is sent to the processor, and associated data input is assigned to the next data object in order of priority 690-697.

If the name is not in the First-level Name Table, other means can be used to find the content requested, or alternatively and additionally an error can be generated and handled by appropriate error-handling software 640.

Assembling the Request

Figure 7:
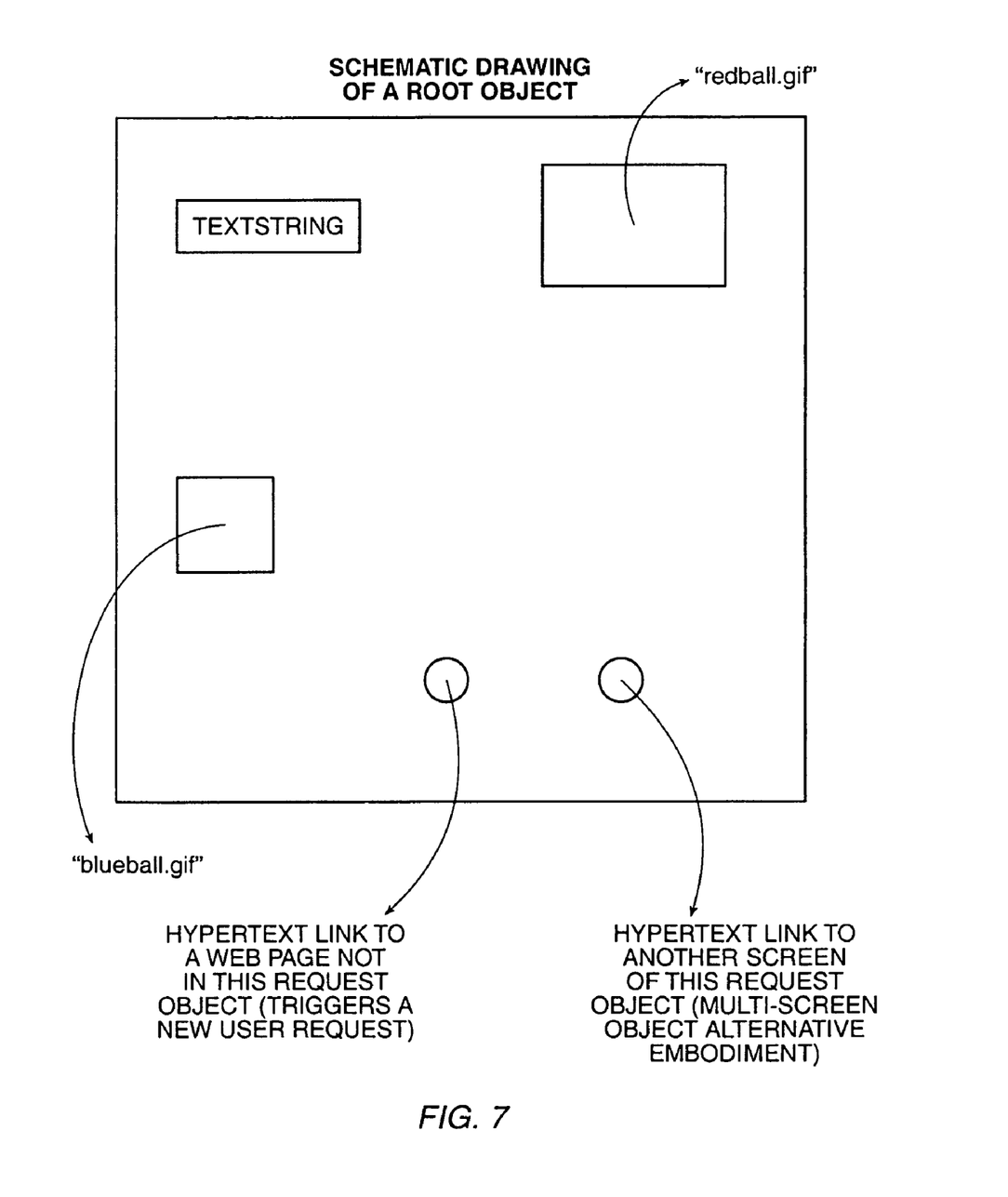
FIG. 7 is a schematic diagram of a root object.

FIG. 7 shows a schematic diagram of a root object. A root object has references to zero or more data objects showing where the data object is to go in the root object. Preferably, the root object is an HTML root web page, and the root web page contains references to data objects that go in the web pages, for example but without limitation gif files, such as "redball.gif". The web page or other desired data object is assembled by methods used in HTML programming or any other known method.

In a preferred embodiment, the processor 130 assembles the data into the desired data object, as known in the art. In a preferred embodiment, the data is displayed 170 by running it through a graphics card 160, 699. In an alternative embodiment, the data need not be displayed. For instance, the data may be a text file or data that is to be stored or manipulated by the processor.

In an alternative embodiment there is no root object. This can be the case when the receiver knows how to display the data. For instance, if the data on a channel consists entirely of stock ticker information, the receiver through its operating or application software can have rules for displaying the data, or may let the user determine how to display the data. Alternatively, the data can contain information regarding how the data should be displayed, in conjunction with some constraints at the receiver.

Other Aspects of the Invention

Certain aspects of the content groupings are preferably decided taking into consideration technical considerations. For instance, a low-level object that is in many web pages can be assigned more bandwidth than a low-level object in only one infrequently requested web page. However, assigning a very large bandwidth to a low-level object is not necessarily advantageous if the rest of the elements in the page have cycles that are much longer than the low-level object.

Virtual Directory

In an alternative embodiment, a list of human-readable names, without the names of the low-level objects composing it, can be kept available to the receiver, by being stored on the receiver, or by being constantly transmitted on a channel. The list can contain many entries because little or no data is kept for each name. Upon a user request for an object, the receiver looks up the information required to retrieve the object by tuning to the channel carrying this information. The channel carrying the information can be an entry in the list of human-readable names, or the channel can be one or more channels that always carry the information.

In an alternative embodiment, the information required to retrieve an object can merely be the location of the object (in a file-oriented approach); that is, no low-level objects are used.

Multi-Screen Objects

In a preferred embodiment, a request object can be a multi-screen object. The receiver interprets the HTML and displays images and sounds in response thereto.

Distribution of Data Objects

In a preferred embodiment, the components for a particular web page are not adjacent to each other in the data stream. The reason for this is that, although currently hardware can handle packets of data efficiently, it is not desirable to send a large amount of data to the processor at the same time. This strains the processing resource. Rather, preferably the data for a web page are more or less smoothly distributed in the data stream, as known in the art of data communications.

Root Object Repeatable in Another Root Object

In a preferred embodiment, two root objects cannot be part of the same request object (unless it is a multi-screen request object). In an alternative embodiment, root objects can be included in other root web pages. Methods for displaying web pages within web pages are known in the art of HTML programming.

Data Objects on Multiple Channels

In a preferred embodiment, all the data that composes a request object is carried on one physical channel. In an alternative embodiment, the low-level objects can be on different physical channels. The Locator Table (either the Data Object Locator Table and/or the Root Object Locator Table) would note the correct location, including the channel, for each object. This might be desirable, for instance, if one channel had excess bandwidth, or for administrative ease. For example, it would ease the administrative burden to have a channel that changed rarely if at all, with the data carried on it being frequently-used but rarely-changed data, such as corporate logo data, or banner ad data. It is conceivable that a widely used banner advertisement might be running on all channels, so that under some circumstances it can be efficient to carry the advertisement on only one channel.

Although in the current market set top boxes (receivers) are capable of listening to only one channel at a time, the invention will work with receivers that can listen to more than one channel at a time. Data for a single web page can be distributed on multiple channels, and the data combined by a processor or graphics card or other known methods, enabling the data to be received more quickly. Or, the First-level Name Table for all channels can be broadcast on a single channel, which can always be monitored by one of the channel inputs at the receiver. This broadens the broadcast spectrum that is available or that can be monitored.

Multiple Indirect Locations

In a preferred embodiment, the Data Object Locator Table and Root Object Locator Table have only one physical location listed for each entry. In an alternate embodiment, multiple locations for an entry can be listed. For instance, a data object such as a corporate logo could be carried on two physical channels, with both locations stored in the Locator Table for the data object. This would have the advantage, in a single tuner receiver, that, if the receiver were already tuned to one of the channels the data object is carried on, it would be unnecessary to switch channels. In a receiver with capability to listen to more than one channel at a time, it would have the advantage that the different tuners could be coordinated such that minimal switching between channels is necessary and data is retrieved faster.

In a preferred embodiment, the information is on one channel. However, in an alternative embodiment the First-level Name Table or location information for channels that have related content could be duplicated on each channel.

I claim:

1. A method implemented on an apparatus having at least one processor and at least one memory coupled to said at least one processor for receiving data via multiple channel broadcast media, comprising:

provisioning a data structure storing second-level names in association with each of a plurality of first-level names, each of said plurality of first-level names being associated with a respective data object, said data structure being distinct from said data objects;

receiving a request for a desired data object, said desired data object being associated with one of said plurality of first-level names;

obtaining from said data structure a plurality of second-level names associated with said first-level name, each of said plurality of second-level names being associated with a respective low-level data object, a retrieval priority for said low-level data object being set by a content provider by ordering said second-level names in said data structure;

obtaining location information associated with said second-level names via a first broadcast channel, said location information identifying at least two of multiple broadcast channels for carrying data associated with said low-level data objects; and retrieving an associated low level data object for each second-level name, said low level data objects being retrieved in an order corresponding to the order in which said second level names are arranged in said data structure;

wherein said desired data object is a web page comprising at least a portion of said low-level data objects for retrieval and display in order defined by said retrieval priority.

2. The method of claim 1, wherein data associated with respective low-level data objects is received via at least two channels of said multiple channel broadcast medium.

3. The method of claim 1, wherein data associated with respective low-level data objects is broadcast according to a protocol indicated in said location information.

4. The method of claim 1, wherein said location information indicates for each low-level data object a location parameter, a size parameter and a bandwidth parameter.

5. The method of claim 1, wherein said broadcast media comprises at least one of a cable transmission medium, an optical transmission medium, a satellite transmission medium and a radio frequency (RF) transmission medium.

6. The method of claim 1 wherein said broadcast medium is a portion of a computer network.

7. The method of claim 1 wherein said first-level name is a uniform resource locator (URL).

8. The method of claim 1 wherein said first-level name is a web page title.

9. The method of claim 1 wherein said first-level name is a text string.

10. The method of claim 9 wherein said text string is associated with an icon.

11. The method of claim 1 wherein said second-level name takes a minimal amount of storage space.

12. The method of claim 1 wherein said second-level name is an integer.

13. The method of claim 1 wherein said second-level name is an index into a table.

14. The method of claim 1 wherein said location information is accessed through a memory containing a data structure.

15. The method of claim 1 wherein said location information is sufficient to locate said data in a data stream.

16. The method of claim 15 wherein said location information comprises an MPEG table.

17. The method of claim 1, including the further step of combining said plurality of low-level data objects.

18. The method of claim 17 wherein the step of combining results in a portion of said desired data object.

19. The method of claim 18, including the further step of presenting said desired data object.

20. A method implemented on an apparatus having at least one processor and at least one memory coupled to said at least one processor for receiving data via multiple channel broadcast media, comprising:

receiving a request for a desired data object, said desired data object being associated with a first-level name in a table distinct from said desired data object;

obtaining from said table a plurality of second-level names associated with said first-level name, each of said plurality of second-level names being associated with a respective low-level data object, said second level names being stored in said table in an order set by a content provider;

obtaining location information associated with each second-level name, said location information identifying a broadcast channels for carrying a low-level data object associated with each second-level name; and retrieving an associated low level data object for each second-level name, said low level data objects being retrieved in an order corresponding to the order in which said second-level names are arranged in said data table.

21. The method of claim 20 wherein said desired data object is a web page.

22. The method of claim 20 wherein said broadcast medium includes a cable.

23. The method of claim 20 wherein said first-level name is a web page title.

24. The method of claim 20 wherein said location information is accessed through a memory containing a data structure.

25. The method of claim 20 wherein said location information is sufficient to locate said data in a data stream.

26. The method of claim 20, including the further step of combining said plurality of low-level data objects.

27. The method of claim 26 wherein the step of combining results in a portion of said desired data object.

28. The method of claim 20, including the further step of presenting said desired data object.

29. A method implemented on an apparatus having at least one processor and at least one memory coupled to said at least one processor for organizing data for transmission via broadcast media, comprising:

associating a first-level name with data;

organizing said data into a plurality of low-level data objects ordered by retrieval priority, wherein said retrieval priority is set by a content provider; and associating each low-level data object with a second-level name, the second level names being associated in a data structure, the second-level names being arranged in the data structure in an order corresponding to an order of respective retrieval priorities set by a content provider;

associating a location with each second-level name, the associated locations of said second-level names collectively identifying at least two distinct broadcast channels for carrying data associated with said low level data objects.

30. The method of claim 29, including the further step of broadcasting said each one of said plurality of data objects forming said data.

31. The method of claim 30, wherein said each one of said plurality of data objects is broadcast as an MPEG section.

32. The method of claim 30, wherein said each one of said plurality of data objects is formatted for transmission as an MPEG section.

33. The method of claim 29, wherein said data object is formatted for transmission as an UDP packet.

34. An apparatus having at least one processor and at least one memory coupled to said at least one processor for receiving data over a multiple channel broadcast medium, said apparatus comprising:
   a first mechanism configured to receive a request for a desired data object associated with a first-level name;
   a second mechanism configured to obtain a plurality of second level names associated with said first-level name in a data structure distinct from said desired data object, each second-level name being associated with one of a plurality of low-level data objects, said low-level data objects being arranged in said data structure in order by retrieval priority, wherein said retrieval priority is set by a content provider; and
   a third mechanism configured to obtain, via a first broadcast channel, location information associated with said second-level names, said location information identifying at least two distinct broadcast channels for carrying data associated with said plurality of low-level data objects
   wherein said desired data object is a web page comprising at least a portion of said low-level data objects for retrieval and display in order by said retrieval priority.

35. The apparatus of claim 34, wherein data associated with respective low-level data objects is received via at least two channels of said multiple channel broadcast medium.

36. The apparatus of claim 34, wherein data associated with respective low-level data objects is broadcast a number of times as indicated in said location information.

37. The apparatus of claim 34, wherein data associated with respective low-level data objects is broadcast according to a protocol indicated in said location information.

38. The apparatus of claim 34 wherein said location information is sufficient to locate said data in a data stream.

39. The apparatus of claim 34, further including a combine mechanism configured to combine said plurality of low-level data objects.

40. The apparatus of claim 39 wherein said combine mechanism is configured so that the result is a portion of said desired data object.

41. The apparatus of claim 34, further including a presentation mechanism configured to present said desired data object.

42. An apparatus having at least one processor and at least one memory coupled to said at least one processor for receiving data over a multiple channel broadcast media, said apparatus comprising:
   a reception mechanism configured to receive a request for a desired data object, said desired data object being associated with a first-level name;
   a lookup mechanism configured to look up said first-level name in a data structure distinct from said desired data object;
   a first obtain mechanism configured to obtain from said data structure a plurality of second-level names associated with said first-level name, each second-level name being associated with one of a plurality of low-level data objects, said data structure identifying a retrieval priority for each of said low-level data objects, wherein said retrieval priority is set by a content provider; and
   a second obtain mechanism configured to obtain, via a first broadcast channel, location information associated with said second-level names, said location information identifying at least two of multiple broadcast channels for carrying data associated with said low-level data objects.

43. A computer program product, comprising:
   a computer usable storage medium having computer readable code embodied therein for causing a computer to receive data over a multiple channel broadcast medium,
   said computer readable code being configured to cause said computer to effect a reception mechanism configured to receive a request for a desired data object, said desired data object being associated with a first-level name,
   said computer readable program code being configured to cause said computer to effect a first obtain mechanism configured to obtain a plurality of second-level names associated with said first-level name in a data structure distinct from said desired data object, each second-level name being associated with one of a plurality of low-level data objects, said data structure providing an order of retrieval priority for said low-level data objects, said order and said retrieval priority having been set by a content provider,
   said computer readable program code being configured to cause said computer to effect a second obtain mechanism configured to obtain location information associated with said second-level names via a first broadcast channel, said location information identifying at least two of multiple broadcast channels for carrying data associated with said low-level data objects.

* * * * *